United States Patent
Thantharate et al.

(10) Patent No.: US 11,582,668 B1
(45) Date of Patent: Feb. 14, 2023

(54) 5G STANDALONE TRAFFIC PRIORITIZATION

(71) Applicant: T-Mobile USA, Inc., Bellevue, WA (US)

(72) Inventors: Anurag Thantharate, Overland Park, KS (US); Sreekar Marupaduga, Dallas, TX (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/468,370

(22) Filed: Sep. 7, 2021

(51) Int. Cl.
*H04W 36/22* (2009.01)
*H04W 60/04* (2009.01)
*H04W 36/06* (2009.01)

(52) U.S. Cl.
CPC ........... *H04W 36/22* (2013.01); *H04W 36/06* (2013.01); *H04W 60/04* (2013.01)

(58) Field of Classification Search
CPC ...... H04W 36/06; H04W 36/22; H04W 60/04
See application file for complete search history.

(56) References Cited

U.S. PATENT DOCUMENTS

| 11,432,183 B1* | 8/2022 | Marupaduga | H04W 76/15 |
| 2020/0092879 A1* | 3/2020 | Wu | H04W 8/24 |
| 2020/0221290 A1* | 7/2020 | Wiemann | H04W 72/0453 |

* cited by examiner

*Primary Examiner* — Khoa Huynh
(74) *Attorney, Agent, or Firm* — Lee & Hayes, P.C.

(57) ABSTRACT

A base station of a radio access network (RAN) can be configured to prioritize standalone (SA) 5G traffic over non-standalone (NSA) 5G traffic in certain situations, to improve user experiences associated with 5G-specific services implemented via SA 5G networks. The base station can generally instruct 5G user equipment (UE), such SA UEs and NSA UEs, to prioritize camping on an SA priority band. However, if a RAN load level is at or above a threshold, the base station can instruct NSA UEs to prioritize camping on a different priority band in order to relieve congestion on the SA priority band and/or preserve remaining capacity on the SA priority band for SA UEs. When the RAN load level is above a threshold, the base station can also, or alternately, at least briefly delay traffic associated with NSA UEs to prioritize transmission of traffic associated with SA UEs.

20 Claims, 5 Drawing Sheets

5G STANDALONE TRAFFIC PRIORITIZATION

BACKGROUND

Telecommunication networks can use various radio access technologies (RATs), such as Long-Term Evolution (LTE) and fifth generation (5G) New Radio (NR). Many telecommunication networks began transitioning from LTE to 5G NR by using non-standalone (NSA) 5G solutions in which 5G base stations are connected to an LTE core network. Telecommunication networks are also implementing standalone (SA) 5G solutions in which 5G base stations are connected to a 5G core network.

Because many telecommunication networks implemented NSA 5G before SA 5G, some 5G-compatible mobile phones and other user equipment (UE) were deployed with support for NSA 5G, but without support for SA 5G. Other 5G-compatible UEs do support both NSA 5G and SA 5G. Accordingly, a set of 5G-compatible UEs that connect to a 5G base station may include some UEs that support SA 5G and other UEs that do not support SA 5G.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
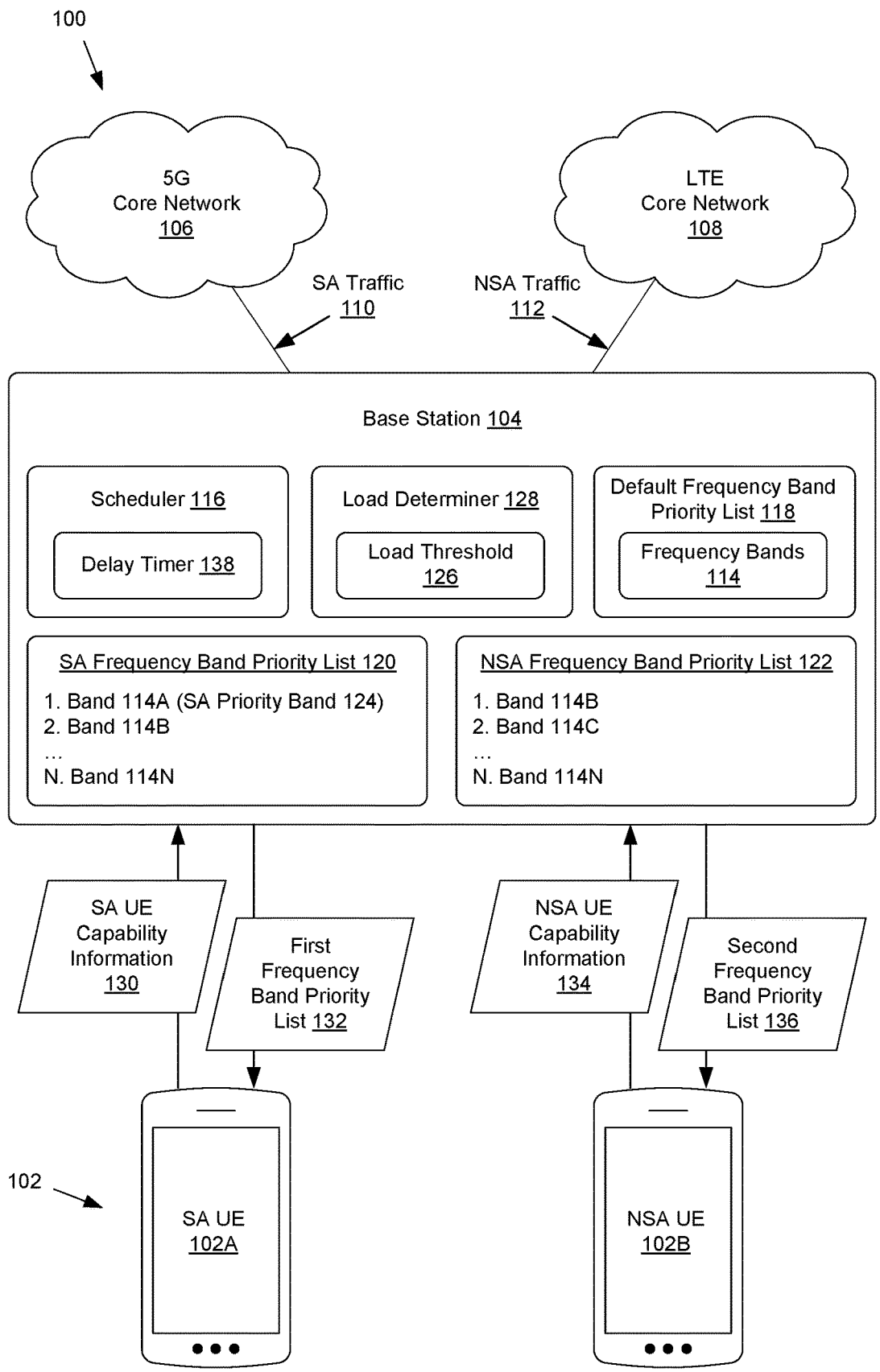
FIG. 1 shows an example of a network environment in which UEs can connect to a telecommunication network.

A radio access network (RAN) of a telecommunication network can be based on 5G NR technology, and can include 5G base stations known as gNBs. 5G-compatible UEs can wirelessly connect to the gNBs, in order to engage in voice calls, video calls, messaging, data transfers, and/or other types of communications and services.

A gNB can be connected to an LTE core network based on a 5G NSA architecture. The gNB can also be connected to a 5G core network based on a 5G SA architecture. Accordingly, the gNB may be configured to handle 5G NSA traffic between NSA UEs and the LTE core network, as well as 5G SA traffic between SA UEs and the 5G core network.

5G SA connections may enable UEs to access 5G-specific services and features that are not available over 5G NSA connections. For example, Voice over New Radio (VoNR) can be a 5G-specific service that is implemented based on the 5G SA architecture. VoNR may provide lower latency, improved sound quality, and/or other benefits relative to Voice over LTE (VoLTE). Accordingly, although NSA UEs may access VoLTE services through 5G NSA connections associated with an LTE core network, SA UEs may have access to VoNR services through 5G SA connections associated with a 5G core network.

Network slicing can be another 5G-specific service that is implemented based on the 5G SA architecture. Network slicing can be used to create different virtual networks that may be associated with different types of services and/or users. For example, the 5G SA architecture can allow the creation of different network slices for Enhanced Mobile Broadband (eMBB) applications, Massive Internet of Things (MIoT) applications, and Ultra-Reliable Low Latency Communication (URLLC) applications. Different network slices may be associated with different network resources, and/or have different attributes, such as different latency attributes or different bandwidth attributes. Network slicing may be implemented in part by the 5G core network, such that network slicing can be used with respect to 5G SA traffic associated with a gNB. However, network slicing may not be available for 5G NSA traffic associated with the same gNB.

A gNB may be connected to multiple UEs. Some of these UEs may support both 5G SA and 5G NSA, and thus be capable of accessing 5G-specific services such as VoNR and network slicing via 5G SA connections. Other UEs connected to the gNB may support 5G NSA, but not 5G SA, and thus may not have access to 5G-specific services via 5G SA connections.

Conventionally, gNBs have not been configured to perform radio resource management and/or scheduling based on distinguishing between traffic associated with NSA UEs and SA UEs. For example, gNBs may be configured to assign NSA UEs and SA UEs to camp on the same frequency bands, and/or to schedule transmissions of 5G NSA and 5G SA traffic equally.

However, when resources associated with the gNB are heavily utilized, treating 5G NSA traffic and 5G SA traffic equally at the gNB can degrade experiences of SA UEs that engage in 5G-specific services. For example, VoNR, network slicing, and/or other 5G-specific services may target lower latencies, higher bandwidths, and/or other differing attributes relative to other types of services. However, if NSA traffic is treated equally to SA traffic at the gNB, assigning resources to NSA traffic may inhibit the ability of the SA traffic to meet latency goals, bandwidth goals, or other goals of 5G-specific services. For instance, if a gNB is configured to assign NSA UEs and SA UEs to camp on the same frequency band, that frequency band may become congested. Latencies associated with traffic on that frequency band may increase due to the congestion, and thereby negatively impact 5G-specific services for SA UEs that have low latency goals.

Traffic associated with 5G-specific services may be associated with particular corresponding Quality of Service (QoS) values, such as a 5G QoS Identifier (5QI) value that is used specifically for VoNR traffic. It may be possible to hard-code RAN elements to determine QoS values associated with traffic, and use the QoS values to distinguish between SA 5G traffic and NSA 5G traffic and prioritize the SA 5G traffic. However, hard-coding such RAN elements to identify and prioritize SA 5G traffic can be difficult, time-consuming, and difficult to maintain over time.

The systems and methods described herein allow a RAN to dynamically prioritize 5G SA traffic over 5G NSA traffic in certain situations. For example, if load levels associated with the gNB exceed a predefined threshold, the RAN may begin instructing NSA UEs to prioritize using different frequency bands than SA UEs in order to limit congestion on frequency bands that are prioritized for SA UEs. The RAN may also, or alternately, use a delay timer to at least briefly delay the transmission of 5G NSA traffic, such that the transmission of 5G SA traffic not subject to the delay can be prioritized over transmission of the delayed 5G NSA traffic.

Example Environment

FIG. 1 shows an example 100 of a network environment in which UEs 102 can connect to a telecommunication network to engage in voice calls, video calls, messaging, data transfers, and/or other types of services and communications. One or more types of UEs 102 can connect to the telecommunication network. UEs 102 can include mobile phones, such as a smart phones or other cellular phones. UEs 102 can also, or alternately, include Internet of Things (IoT) devices, personal digital assistants (PDAs), media players, tablet computers, gaming devices, smart watches, hotspots, personal computers (PCs), such as laptops, desktops, or workstations, or any other type of computing or communication device.

The UEs 102 can support 5G NR technologies. Some UEs 102, such as SA UE 102A shown in FIG. 1, can support both non-standalone (NSA) 5G and standalone (SA) 5G. However, other UEs 102, such as NSA UE 102B shown in FIG. 1, can support NSA 5G but not support SA 5G. In some examples, the UEs 102 can also support one or more other types of radio access technologies, wireless access technologies, protocols, and/or standards, such as LTE/LTE Advanced technology, other fourth generation (4G) technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMax® technology, WiFi® technology, and/or any other previous or future generation of radio access technology or wireless access technology.

Figure 2:
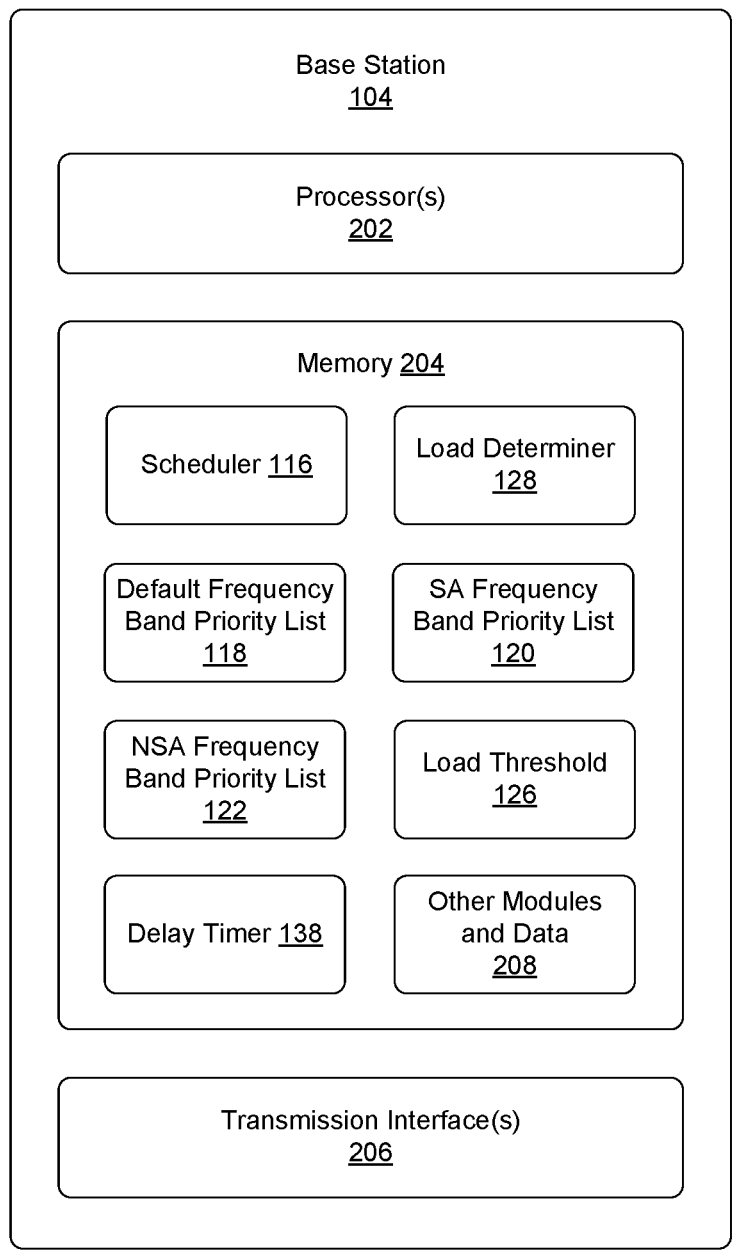
FIG. 2 shows an example of a system architecture for a base station.

The telecommunication network can include a radio access network (RAN) that includes at least one base station 104 that supports 5G NR. For example, the base station 104 shown in FIG. 1 can be a 5G base station known as a gNB. The RAN may include other base stations, including other gNBs and/or LTE base stations known as eNBs. An example system architecture for the base station 104 is shown in FIG. 2, and is described in detail below with reference to that figure. The base station 104 can support both NSA 5G and SA 5G. Accordingly, UEs 102 such as SA UE 102A and NSA UE 102B can establish connections to the base station 104.

The base station 104, and/or other elements of the RAN, can be connected to a 5G core network 106 and an LTE core network 108. The 5G core network 106 and the LTE core network 108 can register UEs 102, set up and manage communication sessions and services for UEs 102, connect UEs 102 to other networks, such as the Internet and/or an Internet Protocol (IP) Multimedia Subsystem (IMS), and/or perform other operations associated with the UEs 102.

The 5G core network 106 can be known as a 5G Core (5GC). The 5G core network 106 can have a service-based system architecture in which different types of network functions operate alone and/or together to implement services. For example, the 5G core network 106 can include an Authentication Server Function (AUSF), Access and Mobility Management Function (AMF), Session Management Function (SMF), User Plane Function (UPF), Network Slice Selection Function (NSSF), Network Exposure Function (NEF), Network Repository Function (NRF), Policy Control Function (PCF), Unified Data Management (UDM), Application Function (AF), and/or other network functions.

The LTE core network 108 can be an LTE packet core network known as an Evolved Packet Core (EPC). The LTE core network 108 can include a Mobility Management Entity (MME), Serving Gateways (S-GWs), Packet Data Network (PDN) Gateways (P-GWs), Home Subscriber Server (HSS), Policy and Charging Rules Function (PCRF), and/or other network elements.

The base station 104 can be connected to the 5G core network 106 according to an SA 5G architecture. The base station 104 can process and route SA traffic 110 between UEs 102, such as the SA UE 102A, and the 5G core network 106. The SA traffic 110 can include traffic for communication sessions and services implemented in part by the 5G core network 106.

Some of the SA traffic 110 can be associated with 5G-specific services or features, such as VoNR, network slicing, and other 5G-specific services or features. Such 5G-specific services may not be available to NSA UEs, such as NSA UE 102B, as the 5G-specific services may be implemented, at least in part, by elements of the 5G core network 106 in association with SA traffic 110. As an example, the SA traffic 110 can include traffic associated with a VoNR call for the SA UE 102A, which may have improved call quality, call setup times, and/or other benefits relative to VoLTE calls.

As another example, the SA traffic 110 can include traffic associated with network slices. Network slicing can be a 5G-specific feature by which distinct virtual networks can be created through the RAN and the 5G core network 106 for different types of services and/or users. For instance, different network slices can be created for eMBB applications, MIoT applications, and URLLC applications. Different network slices can also be created for different types of users or users associated with different organizations, for example based on service level agreements (SLAs). Different network slices may be associated with different network resources, and/or have different attributes, such as different latency attributes or different bandwidth attributes.

The base station 104 can also be connected to the LTE core network 108 according to an NSA 5G architecture. The base station 104 can process and route NSA traffic 112 between UEs 102, such as the NSA UE 102B, and the LTE core network 108. The NSA traffic 112 can include traffic for communication sessions and services implemented in part by the LTE core network 108. As an example, the NSA traffic 112 can include traffic associated with a VoLTE call for the NSA UE 102B.

Elements of the RAN, including the base station 104 and other base stations, can support multiple frequency bands 114. UEs 102 can also support multiple frequency bands 114. Accordingly, UEs 102 can wirelessly connect to the base station 104 using carriers in frequency bands 114 supported by both the UEs 102 and the base station 104. Such frequency bands 114 can include frequency bands in low-band frequencies under 1 GHz, mid-band frequencies between 1 GHz and 6 GHz, and/or high-band frequencies above 6 GHz, such as millimeter wave (mmW) frequencies above 24 GHz.

As an example, the base station 104 and/or the UEs 102 may be configured to support one or more of the frequency bands 114 shown below in Table 1, and/or one or more other frequency bands 114. Although Table 1 shows example frequency bands in the 5G NR spectrum, the RAN and/or UEs 102 can also support frequency bands 114 in the LTE spectrum.

TABLE 1

Example Frequency Bands in 5G NR Spectrum

| Frequency Band | | Shorthand Frequency (MHz) | Uplink Band (MHz) | Downlink Band (MHz) |
|---|---|---|---|---|
| n2   | (Mid-band) | 1900 | 1850-1910 | 1930-1990 |
| n12  | (Low-band) | 700  | 699-716   | 729-746   |
| n25  | (Mid-band) | 1900 | 1850-1915 | 1930-1995 |
| n41  | (Mid-band) | 2500 | 2496-2690 | 2496-2690 |
| n66  | (Mid-band) | 1700 | 1710-1780 | 2110-2200 |
| n71  | (Low-band) | 600  | 663-698   | 617-652   |
| n260 | (mmW)      | 39000 (39 GHz) | 37000-40000 | 37000-40000 |
| n261 | (mmW)      | 28000 (28 GHz) | 27500-28350 | 27500-28350 |

Different frequency bands 114 may have different attributes and/or cover different geographical areas. For example, in some situations low-bands can cover the largest geographical areas and provide data transmission speeds that are sufficient for many applications. Mid-bands can, in some situations, cover smaller geographical areas than low-bands, but can provide higher data transmission speeds than low-bands. High-bands can, in some situations, cover the smallest geographical areas, but provide the highest data transmission speeds.

The base station 104 can have a scheduler 116 that is configured to manage radio resources associated with the base station 104 and/or the RAN, including assignments of radio resources to the UEs 102. For example, the scheduler 116 can provide UEs 102 with frequency band priority lists that indicate which frequency bands 114 the RAN supports, and a priority order of those frequency bands 114. The UEs 102 can be configured to, based on priorities of the frequency bands 114 indicated in the frequency band priority lists, select frequency bands 114 to camp on and/or to use for data transmissions.

As a non-limiting example, a UE can perform cell selection and/or cell re-selection procedures to search through frequencies of the frequency bands 114 and find a suitable cell to camp on. The UE can be configured to prioritize camping on frequencies of specific frequency bands 114, based on priorities of the frequency bands 114 indicated in a frequency band priority list provided by the base station 104 or another base station. The UE can perform such cell selection and/or cell re-selection procedures when the UE first powers on and attaches to the telecommunication network, during a mobility operation when the UE is moving from an area served by one base station to an area served by another base station, during a handover operation when the UE determines that another cell may provide improved signal strengths or other metrics relative to a current cell, when the UE transitions between an idle state and a connected state, and/or at other times or during other types of operations.

The base station 104 can transmit frequency band priority lists to UEs 102 in System Information Blocks (SIBs), Radio Resource Configuration (RRC) messages, and/or other types of messages or data. As an example, the base station 104 can broadcast one or more SIBs, or transmit one or more SIBs to specific UEs 102, that indicate the frequency bands 114 supported by the RAN, and/or priorities associated with the frequency bands 114. As another example, when a UE transitions from an RRC connected state to an RRC idle state, the base station 104 can send an RRC Connection Release message to the UE that indicates the frequency bands 114 supported by the RAN and/or priorities associated with the frequency bands 114.

In some examples, the base station 104 can have a default frequency band priority list 118 that the base station 104 can broadcast to UEs 102, or provide directly to UEs 102. The default frequency band priority list 118 can include a default list of frequency bands 114 supported by the RAN, and/or default priorities associated with those frequency bands 114. In some examples, the base station 104 can broadcast the default frequency band priority list 118 in SIBs, such that UEs 102 can use the default frequency band priority list 118 to select frequencies to use to initially attach to the base station 104. Other base stations, including other gNBs and/or LTE eNBs, can also be configured to broadcast or provide the default frequency band priority list 118 to UEs 102, such that the UEs 102 can use the default frequency band priority list 118 during cell selection and/or cell re-selection procedures to find suitable cells.

In some examples, the default frequency band priority list 118 may identify 5G NR frequency bands and LTE frequency bands, and/or corresponding priorities of the 5G NR frequency bands and LTE frequency bands. Accordingly, if an LTE UE that is not compatible with either NSA 5G or SA 5G receives the default frequency band priority list 118 from an eNB via broadcast SIBs, the LTE UE can search for a suitable cell among the LTE frequency bands. However, if a 5G UE receives the default frequency band priority list 118 via broadcast SIBs, the 5G UE can search for a suitable cell among both the 5G NR frequency bands and the LTE frequency bands.

The base station 104 can also have an SA frequency band priority list 120 and an NSA frequency band priority list 122. In some examples, the base station 104 can use one of the SA frequency band priority list 120 or the NSA frequency band priority list 122 as the default frequency band priority list 118. In other example, the SA frequency band priority list 120 and the NSA frequency band priority list 122 can be different from the default frequency band priority list 118.

The SA frequency band priority list 120 can indicate frequency bands 114, such as frequency bands 114A through 114N, and priorities associated with those frequency bands 114. The highest-priority frequency band indicated in the SA frequency band priority list 120 can be an SA priority band 124. For example, the highest-priority frequency band 114A indicated by the SA frequency band priority list 120 can be the SA priority band 124. The SA priority band 124 can be a frequency band that has been designated by an operator of the RAN as a priority band for 5G-specific services such as VoNR or network slicing.

As a non-limiting example, the SA priority band 124 indicated by the SA frequency band priority list 120 can be a specific low-band, such as the n71 band, that the operator has determined will provide users with the best VoNR call experience. In this example, although the SA frequency band priority list 120 can identify the n71 low-band as the SA priority band 124 and/or the highest-priority frequency band, the SA frequency band priority list 120 can also indicate one or more other frequency bands that have lower priorities than the n71 low-band, such as the n41 mid-band, a mmW band, and/or other frequency bands 114.

The NSA frequency band priority list 122 can be similar to the SA frequency band priority list 120. However, in some examples, the NSA frequency band priority list 122 can omit the SA priority band 124. For instance, although the SA frequency band priority list 120 can indicate that frequency band 114A (the SA priority band 124) is the highest-priority frequency band, the NSA frequency band priority list 122 can omit frequency band 114A and instead indicate that frequency band 114B is the highest-priority frequency band. Frequency band 114B may be the second-highest-priority frequency band in the SA frequency band priority list 120, but the highest-priority frequency band in the NSA frequency band priority list 122. In other examples, the NSA frequency band priority list 122 can include the SA priority band 124, but indicate that the SA priority band 124 has a lower priority than one or more other frequency bands 114 that have higher priorities.

As a non-limiting example, although the SA frequency band priority list 120 can indicate that the n71 low-band has the highest priority (and is thus the SA priority band 124), and the n41 mid-band has the second-highest priority, the NSA frequency band priority list 122 can omit the n71 low-band and indicate that the n41 mid-band is the highest-priority frequency band on the NSA frequency band priority list 122. Alternatively, the NSA frequency band priority list 122 can indicate that the n41 mid-band is the highest-priority frequency band, but include the n41 mid-band as an additional frequency band with a lower priority than the n71 low-band.

The base station 104 can provide UEs 102 with either the SA frequency band priority list 120 or the NSA frequency band priority list 122 in response to UE capability information received from the UEs 102. The UE capability information associated with a UE can indicate network and/or radio capabilities of the UE, such as which frequency bands 114 the UE supports or whether the UE supports NSA 5G and/or SA 5G. In some examples, a UE can provide its UE capability information to the base station 104 when the UE initially connects to the base station 104 during an initial network registration, during a mobility or handover operation, when the UE transitions between a connected state and an idle state, and/or at other times or as part of other operations. For instance, a UE can provide UE capability information to the base station 104 in association with a Tracking Area Update or RRC reconfiguration. In other examples, a UE can send its UE capability information to the base station 104 in response to a request, such as a UE capability enquiry, from the base station 104.

If the UE capability information associated with a UE indicates that the UE is an SA UE that supports SA 5G, the base station 104 can provide the SA UE with information associated with the SA frequency band priority list 120. Accordingly, based on the information associated with the SA frequency band priority list 120, the SA UE can prioritize camping on the SA priority band 124 and/or using the SA priority band 124 for data transmissions.

If the UE capability information associated with a UE instead indicates that the UE is an NSA UE that supports NSA 5G, but does not support SA 5G, the base station 104 can return information to the NSA UE that is associated with either the SA frequency band priority list 120 or the NSA frequency band priority list 122, depending on a current RAN load level. If the RAN load level is below a corresponding load threshold 126, the base station 104 can provide the NSA UE with information associated with the SA frequency band priority list 120, such that the NSA UE can prioritize camping on the SA priority band 124 and/or using the SA priority band 124 for data transmissions. However, if the RAN load level is at or above the corresponding load threshold 126, the base station 104 can provide the NSA UE with information associated with the NSA frequency band priority list 122 that omits or de-prioritizes the SA priority band 124. Accordingly, the NSA UE can prioritize camping on, and/or using, other frequency bands 114 instead of the SA priority band 124 during situations in which the RAN load level is at or above the load threshold 126.

The base station 104 can have a load determiner 128 that is configured to determine current RAN load levels, such as current utilization and/or capacity levels associated with the base station 104 overall and/or associated with one or more frequency bands 114. The load determiner 128 can also be configured with the load threshold 126, such that the load determiner 128 can compare a current RAN load level against the load threshold 126. The load threshold 126 can be a configurable value that can be set by an operator of the RAN. As a non-limiting example, the load threshold 126 can be a 75% utilization of the SA priority band 124. In other examples, the load threshold 126 can be above or below a 75% utilization of the SA priority band 124. In still other examples, the load threshold 126 can be a value associated with an overall utilization rate or capacity of the base station 104, a value associated with an overall utilization rate across multiple frequency bands 114, or any other type of RAN load level value.

If UE capability information associated with a UE indicates that the UE supports NSA 5G and does not support SA 5G, the base station 104 can determine whether the load determiner 128 indicates that a current RAN load level is lower than the corresponding load threshold 126. If the current RAN load level is below the load threshold 126, the base station 104 can provide information associated with the SA frequency band priority list 120 to the UE, such that the UE can prioritize camping on the SA priority band 124 and/or using the SA priority band 124 for data transmissions. However, if the current RAN load level is at or above the load threshold 126, the base station 104 can provide information associated with the NSA frequency band priority list 122 to the UE, such that the UE does not prioritize camping on the SA priority band 124 and/or using the SA priority band 124 for data transmissions.

Overall, the base station 104 can provide information associated with the SA frequency band priority list 120 to SA UEs regardless of the current RAN load level. As a non-limiting example, the SA UE 102A shown in FIG. 1 can provide the base station 104 with SA UE capability information 130 indicating that the SA UE 102A supports both NSA 5G and SA 5G. The base station 104 can return a first frequency band priority list 132, corresponding to the SA frequency band priority list 120, to the SA UE 102A. The first frequency band priority list 132 can identify the SA priority band 124 as the highest-priority frequency band, such that the SA UE 102A prioritizes camping on and/or using the SA priority band 124.

In some examples, the first frequency band priority list 132 can be a copy of the SA frequency band priority list 120. In other examples, the first frequency band priority list 132 can be derived from the SA frequency band priority list 120. For instance, if the SA UE capability information 130 indicates that the SA UE 102A does not support all of the frequency bands 114 on the SA frequency band priority list 120, the first frequency band priority list 132 can be a version of the SA frequency band priority list 120 that omits frequency bands 114 not supported by the SA UE 102A.

However, although the base station 104 can provide information associated with the SA frequency band priority list 120 to SA UEs regardless of the current RAN load level, the base station 104 can be configured to provide different frequency band priority lists to NSA UEs depending on the current RAN load level. For instance, the NSA UE 102B shown in FIG. 1 can provide the base station 104 with NSA UE capability information 134 indicating that the NSA UE 102B supports NSA 5G, but does not support SA 5G. The base station 104 can use the load determiner 128 to determine a current RAN load level, and determine whether the current RAN load level is below the corresponding load threshold 126. The base station 104 can return a second frequency band priority list 136 to the NSA UE 102B that corresponds to either the SA frequency band priority list 120 or the NSA frequency band priority list 122, depending on whether the current RAN load level is below the load threshold 126.

In some examples, the second frequency band priority list 136 can be a copy of either the SA frequency band priority list 120 or the NSA frequency band priority list 122. In other examples, the second frequency band priority list 136 can be derived from the SA frequency band priority list 120 or the NSA frequency band priority list 122. For instance, if the NSA UE capability information 134 indicates that the NSA UE 102B does not support all of the frequency bands 114 on the SA frequency band priority list 120 or the NSA frequency band priority list 122, the second frequency band priority list 136 can be a version of one of those lists that omits frequency bands 114 not supported by the NSA UE 102B.

In situations in which a current RAN load level is below a corresponding load threshold 126, the second frequency band priority list 136 provided to the NSA UE 102B by the base station 104 can correspond with the SA frequency band priority list 120, and can cause the NSA UE 102B to prioritize camping on, and/or using, the SA priority band 124. In these situations, usage of the SA priority band 124 by the NSA UE 102B may be unlikely to impact the experience of SA UEs, such as the SA UE 102A in association with the SA priority band 124. For example, if the load threshold 126 is a 75% utilization of the SA priority band 124, and the current RAN load level is a 50% utilization of the SA priority band 124, allowing the NSA UE 102B to use the SA priority band 124 may be unlikely to increase congestion on the SA priority band 124 to a degree that would delay SA traffic 110 on the SA priority band 124 or otherwise negatively impact 5G-specific services used by SA UEs via the SA priority band 124. Accordingly, the second frequency band priority list 136 can cause the NSA UE 102B to prioritize camping on SA priority band 124 and/or using the SA priority band 124 for NSA traffic 112.

However, in other situations in which the current RAN load level is at or above the corresponding load threshold 126, the second frequency band priority list 136 provided to the NSA UE 102B by the base station 104 can correspond with the NSA frequency band priority list 122. Because the NSA frequency band priority list 122 can omit or deprioritize the SA priority band 124, the second frequency band priority list 136 being based on the NSA frequency band priority list 122 can prevent the NSA UE 102B from prioritizing camping on, and/or using, the SA priority band 124. Preventing the NSA UE 102B from prioritizing camping on, and/or using, the SA priority band 124 can avoid increasing congestion on the SA priority band 124 during situations in which the current RAN load level is already at or above the corresponding load threshold 126, and thereby avoid delaying SA traffic on the SA priority band 124 or otherwise negatively impacting 5G-specific services used by SA UEs via the SA priority band 124. Preventing the NSA UE 102B from prioritizing camping on, and/or using, the SA priority band 124 can also preserve remaining capacity on the SA priority band 124 for SA UEs.

In some examples, the base station 104 can dynamically shift NSA UEs from prioritizing camping on and/or using the SA priority band 124 to prioritizing camping on and/or using other frequency bands 114. For example, if the base station 104 or another base station previously instructed the NSA UE 102B to prioritize camping on the SA priority band 124, but the current RAN load level has increased to a level above the corresponding load threshold, the base station 104 can transmit a new frequency band priority list to the NSA UE 102B that is based on the NSA frequency band priority list 122. The new frequency band priority list can instruct the NSA UE 102B to stop prioritizing camping on the SA priority band 124, and instead prioritize camping on one or more other frequency bands 124. The base station 104 can send the new frequency band priority list to the NSA UE 102B in SIBs, an RRC Connection Release message, or other data, for instance in association with a handover or mobility operation, when the NSA UE 102B changes from a connected state to an idle state, or at any other time.

Overall, the base station 104 can configure SA UEs and NSA UEs to prioritize camping on, and/or using, the SA priority band 124 during situations in which a RAN load level is below the corresponding load threshold 126, such as when the SA priority band 124 is not congested. However, in other situations in which the RAN load level is at or above the corresponding load threshold 126, such as when the SA priority band 124 is congested, the base station 104 can prioritize SA UEs and/or SA traffic 110 over NSA UEs and/or NSA traffic 112 by instructing SA UEs to prioritize the SA priority band 124, and by instructing NSA UEs to prioritize other frequency bands 114. Accordingly, by instructing NSA UEs to prioritize other frequency bands 114 when the RAN load level is at or above the corresponding load threshold 126, remaining capacity on the SA priority band 124 can be reserved for SA UEs and traffic associated with the NSA UEs may be less likely to negatively impact 5G-specific services used by SA UEs via the SA priority band 124.

In some examples, the base station 104 may be configured with multiple SA frequency band priority lists and/or multiple corresponding NSA frequency band priority lists. Different frequency band priority lists may be associated with different types of UEs, different types of services, and/or other attributes.

For example, a first SA frequency band priority list may be associated with eMBB services. The first SA frequency band priority list may accordingly indicate that a first mid-band is the SA priority band 124, as that first mid-band may have the highest capacity and may be likely to provide the best user experience with respect to eMBB services. In this example, the first SA frequency band priority list may be associated with a first NSA frequency band priority list that omits the first mid-band, and instead indicates that a second mid-band is the highest-priority frequency band. Accordingly, during situations in which the RAN load level is at or above the load threshold 126, the base station 104 can use the first NSA frequency band priority list to shift NSA UEs to the second mid-band and preserve capacity on the first mid-band for SA UEs to avoid degrading user experiences with respect to eMBB services engaged in by the SA UEs.

The base station 104 may also have a second SA frequency band priority list that is associated with MIoT services. The second SA frequency band priority list may indicate that a first low-band is the SA priority band 124, as the first low-band may cover the largest range and be able to reach the most IoT devices. The second SA frequency band priority list may be associated with a second NSA frequency band priority list that omits the first low-band, and instead indicates that a second low-band is the highest-priority frequency band. Accordingly, during situations in which the RAN load level is at or above the load threshold 126, the base station 104 can use the first NSA frequency band priority list to shift NSA UEs to the second low-band and preserve capacity on the first low-band for SA UEs, including IoT devices that support SA 5G, to avoid degrading the ability of the IoT devices to engage in MIoT services.

Accordingly, in some examples, the base station 104 can select, out of a set of multiple SA frequency band priority lists and/or NSA frequency band priority list that are associated with different UE types or application types, which SA frequency band priority lists and/or NSA frequency band priority list to provide to a particular UE. For example, UE capability information provided by the UE may indicate a UE type that corresponds to a particular one of the frequency band priority lists. As another example, UE capability information provided by an SA UE may indicate service slice type (SST) values or other data indicating which specific types of 5G-specific services or slices the SA UE supports. The base station 104 can accordingly select a particular SA frequency band priority list that indicates a particular SA priority band associated with the UE type or an application or service type indicated by the UE, and provide the selected SA frequency band priority list to the UE.

In some examples, the base station 104 can also, or alternately, use a delay timer 138 to prioritize traffic associated with SA UEs, relative to traffic associated with SA UEs, during situations in which the RAN load level is at or above a load threshold. For example, during such situations, the base station 104 can use the delay timer 138 to at least briefly delay traffic associated with NSA UEs. The base station 104 may be configured to avoid enforcing the delay timer 138 with respect to traffic associated with SA UEs, but to enforce the delay timer 138 with respect to traffic associated with NSA UEs. Accordingly, the base station 104 can prioritize SA UEs and/or SA traffic 110 over NSA UE and/or NSA traffic 112 by processing traffic associated with the SA UEs normally and at least briefly delaying the traffic associated with the NSA UEs.

The delay timer 138 can cause delays in transmissions of traffic associated with NSA UEs by milliseconds, microseconds, or other brief time periods that may be unlikely to be perceived by users of the NSA UEs. However, such user-imperceptible delays in traffic associated with the NSA UEs can allow the base station 104 to prioritize transmissions of non-delayed traffic associated with SA UEs, and thereby avoid degrading user experiences associated with the SA UEs and/or 5G-specific services.

For instance, in situations in which traffic associated with NSA UEs and SA UEs might otherwise have been delayed equally due to congestion or other RAN load levels, slightly delaying the traffic associated with the NSA UEs by microseconds or milliseconds according to the delay timer 138 can allow the base station 104 to avoid delaying other traffic associated with the SA UEs that might negatively impact 5G-specific services such as VoNR or network slicing. As an example, an SA 5G network slice for URLLC services may target low latency values for data transmissions. Accordingly, by delaying traffic associated with NSA UEs accordingly to the delay timer 138, and by not similarly delaying traffic associated with SA UEs, traffic of URLLC services used by the SA UEs may be more likely to meet corresponding low latency targets.

In some examples, the scheduler 116 can implement the delay timer 138 based on slot assignments for uplink and/or downlink traffic associated with NSA UEs. For example, the scheduler 116 can periodically assign resources, such as slots in frames or subframes, to UEs 102 connected to the base station 104. The scheduler 116 can accordingly assign NSA UEs fewer slots, or slots that are spaced apart by larger time durations, based on the delay timer 138 and relative to slots assigned to SA UEs. In other examples, the scheduler 116 can implement the delay timer 138 by causing the base station 104 to hold data packets associated with NSA UEs in a buffer for longer periods of time than hold data packets associated with SA UEs. In still other examples, the scheduler 116 can cause the base station 104 and/or NSA UEs to delay transmission of traffic associated with the NSA UEs in any other way, such as by explicitly instructing NSA UEs to delay transmitting traffic by a period of time corresponding to the delay timer 138.

In some examples, the load determiner 128 can be configured to compare a current RAN load level against multiple load thresholds. A lower load threshold can be associated with the scheduler 116 implementing the delay timer 138, while a higher load threshold can be associated with the NSA priority band priority list. If a current RAN load level is below both load thresholds, the base station 104 can be configured to treat traffic associated with SA UEs and NSA UEs equally. If the current RAN load level is at or above the lower load threshold, but below the higher load threshold, the base station 104 can be configured to use the delay timer 138 to delay traffic associated with NSA UEs, and not delay traffic associated with SA UEs. If the current RAN load level is at or above the higher load threshold, the base station 104 can provide information associated with the NSA frequency band priority list 122 to NSA UEs, such that remaining capacity on the SA priority band 124 can be reserved for SA UEs.

As a non-limiting example, the lower load threshold can be a 70% utilization of the SA priority band 124, while the higher load threshold can be a 75% utilization of the SA priority band 124. In this example, when the utilization of the SA priority band 124 is below the lower load threshold of 70%, the base station 104 can provide information associated with the SA frequency band priority list to both SA UEs and NSA UEs, such that SA UEs and NSA UEs can both prioritize camping on and using the SA priority band 124. The base station 104 can also avoid delaying traffic associated with the NSA UEs when the utilization of the SA priority band 124 is below the lower load threshold of 70%.

However, in this example, if the utilization of the SA priority band 124 climbs to a level that is at or above the lower load threshold of 70%, but is below the higher load threshold of 75%, the base station 104 can begin delaying traffic associated with the NSA UEs based on the delay timer in order to prioritize non-delayed traffic associated with the SA UEs. The base station 104 can continue providing information associated with the SA frequency band priority list to both SA UEs and NSA UEs when the utilization of the SA priority band 124 is below the higher load threshold of 75%, such that SA UEs and NSA UEs can both prioritize camping on and using the SA priority band 124.

If the utilization of the SA priority band 124 climbs further to a level that at or above the higher load threshold of 75% in this example, the base station 104 can begin providing information associated with the NSA frequency band priority list 122 to NSA UEs, in order to configure the NSA UEs to not prioritize camping on or using the SA priority band 124. This can decrease congestion on the SA priority band 124, or prevent additional usage of the SA priority band 124 by NSA UEs, and preserve capacity on the SA priority band 124 for SA UEs. In some examples, the base station 104 may also continue to implement the delay timer 138 with respect to traffic associated with the NSA UEs when the utilization of the SA priority band 124 is above the higher load threshold.

Example Architecture

FIG. 2 shows an example 200 of a system architecture for the base station 104, in accordance with various examples. The base station 104 can be a 5G gNB that supports SA 5G and NSA 5G. As shown, the base station 104 can include processor(s) 202, memory 204, and transmission interfaces 206.

The processor(s) 202 may be a CPU or any other type of processing unit. Each of the one or more processor(s) 202 may have numerous ALUs that perform arithmetic and logical operations, as well as one or more CUs that extract instructions and stored content from processor cache memory, and then executes these instructions by calling on the ALUs, as necessary, during program execution. The processor(s) 202 may also be responsible for executing all computer-executable instructions and/or computer applications stored in the memory 204.

In various examples, the memory 204 can include system memory, which may be volatile (such as RAM), non-volatile (such as ROM, flash memory, etc.) or some combination of the two. The memory 204 can also include additional data storage devices (removable and/or non-removable) such as, for example, magnetic disks, optical disks, or tape. Memory 204 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, DVD, or other optical storage, magnetic cassettes, magnetic tape, magnetic disk storage or other magnetic storage devices, or any other non-transitory medium which can be used to store the desired information and which can be accessed by the base station 104. Any such non-transitory computer-readable media may be part of the base station 104.

The memory 204 can store computer-readable instructions and/or other data associated with operations of the base station 104. For example, the memory 204 can store computer-readable instructions associated with the scheduler 116 and the load determiner 128, as well as data associated with the default frequency band priority list 118, the SA frequency band priority list 120, the NSA frequency band priority list 122, the load threshold 126 and/or other load thresholds, the delay timer 138, and/or other modules and data 208. The other modules and data 208 can be utilized by the base station 104 to perform or enable performing any action taken by the base station 104. The other modules and data 208 can include a platform, operating system, firmware, and/or applications, and data utilized by the platform, operating system, firmware, and/or applications.

The transmission interfaces 206 can include one or more modems, receivers, transmitters, antennas, error correction units, symbol coders and decoders, processors, chips, application specific integrated circuits (ASICs), programmable circuit (e.g., field programmable gate arrays), firmware components, and/or other components that can establish connections with one or more UEs 102, other base stations or elements of the RAN, elements of the 5G core network 106, elements of the LTE core network 108, and/or other network elements, and can transmit data over such connections. For example, the transmission interfaces 206 can establish connections with the UES 102 over air interfaces. The transmission interfaces 206 can also support transmissions using one or more radio access technologies, such as 5G NR.

Example Operations

Figure 3:
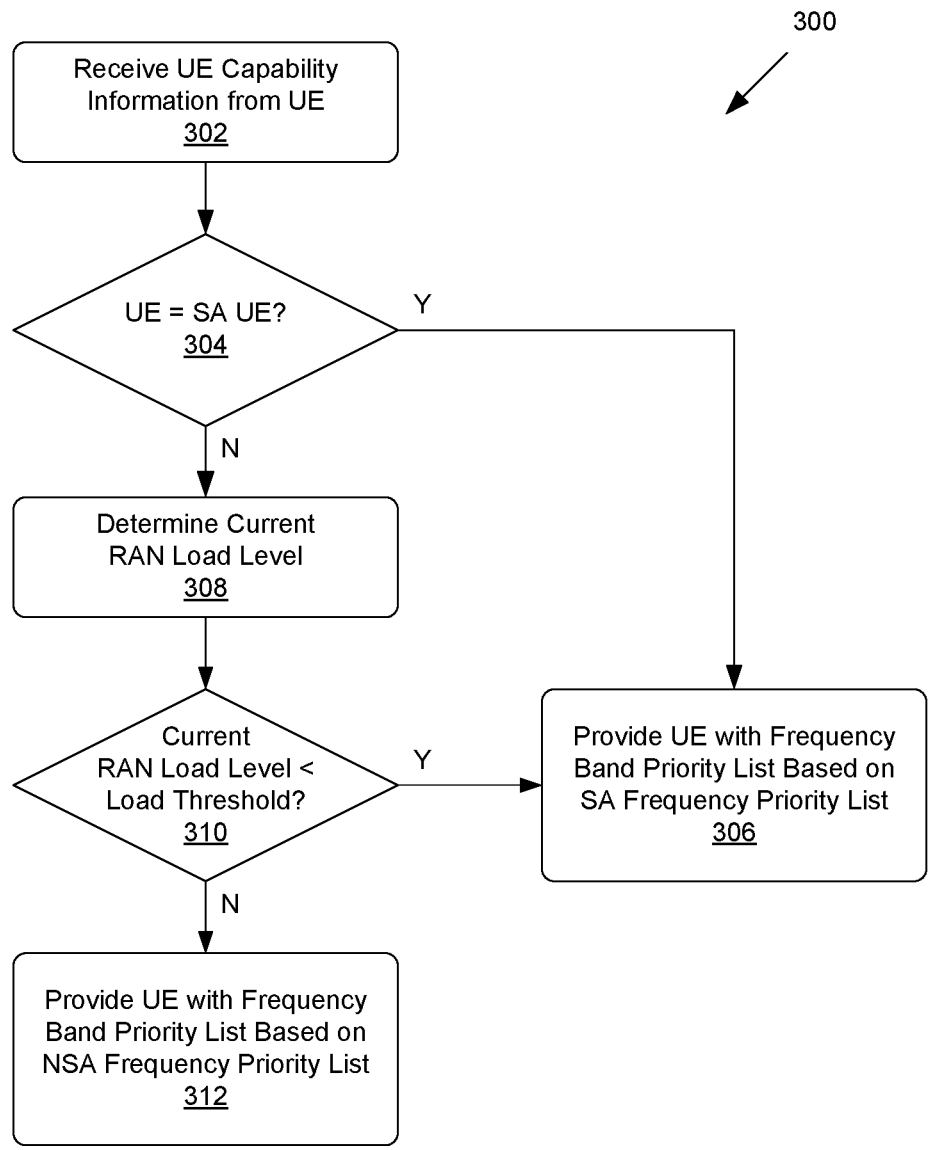
FIG. 3 shows a flowchart of a first example method by which a base station can prioritize traffic associated with SA UEs over traffic associated with NSA UEs in some situations.

FIG. 3 shows a flowchart of a first example method 300 by which the base station 104 can prioritize traffic associated with SA UEs over traffic associated with NSA UEs in some situations. At block 302, the base station 104 can receive UE capability information from a UE. The UE capability information can indicate whether the UE supports NSA 5G and/or SA 5G. If the UE capability information indicates that the UE supports both NSA 5G and SA 5G, the base station 104 can determine that the UE is an SA UE, such as the SA UE 102A shown in FIG. 1. If the UE capability information instead indicates that the UE supports NSA 5G, but does not support SA 5G, the base station 104 can determine that the UE is an NSA UE, such as the NSA UE 102B shown in FIG. 1.

In some examples, the base station 104 can receive the UE capability information from the UE during an initial registration of the UE with the telecommunication network, for instance when the UE powers on and initially attaches to the base station 104. In other examples, the base station 104 can receive the UE capability information from the UE during a mobility or handover operation in which the UE transitions from another base station to the base station 104, during a connection release operation in which the UE transitions from a connected state to an idle state, in response to a request from the base station 104 for the UE capability information, or at other times or in association with other types of operations.

At block 304, the base station 104 can determine whether the UE is an SA UE, based on the UE capability information received from the UE at block 302. If the UE capability information indicates that the UE is an SA UE (Block 304—Yes), the base station 104 can, at block 306, provide the UE with a frequency band priority list that is based on the SA frequency band priority list 120. For example, the base station 104 can transmit the SA frequency band priority list 120, or a frequency band priority list derived from the SA frequency band priority list 120, to the UE. The base station 104 can transmit the frequency band priority list to the UE using one or more SIBs, an RRC Connection Release message, or another type of data or message. The frequency band priority list provided to the UE at block 306 can indicate that the SA priority band 124 is the highest-priority frequency band, such that the UE can prioritize camping on and/or using the SA priority band 124.

If the UE capability information instead indicates that the UE is an NSA UE that does not support SA 5G (Block 304—No), the base station 104 can determine a current RAN load level at block 308. In some examples, the current RAN load level can be an overall load level, utilization rate, and/or other loading metric associated with the computing resources and/or radio resources associated with base station 104. In other examples, the current RAN load level can be associated with the SA priority band 124 specifically, such a utilization rate of the SA priority band 124, a number of UEs 102 connected to the base station 104 via the SA priority band 124, and/or any other loading metric associated with the SA priority band 124.

At block 310, the base station 104 can determine whether the current RAN load level determined at block 308 is below a load threshold. The load threshold can be configurable value defined by an operator of the base station 104. If the base station 104 determines that the current RAN load level is below the load threshold (Block 310—Yes), the base station 104 can provide the UE with a frequency band priority list that is based on the SA frequency band priority list 120 at block 306, as described above. In this situation, although the base station 104 determined at block 304 that the UE is an NSA UE, the base station 104 can provide the NSA UE with the SA frequency band priority list 120, or a frequency band priority list derived from the SA frequency band priority list 120, to cause the NSA UE to prioritize camping on and/or using the SA priority band 124.

However, if the base station 104 determines that the current RAN load level is at or above the load threshold (Block 310—No), the base station 104 can, at block 312, provide the UE with a frequency band priority list that is based on the NSA frequency band priority list 122. For example, the base station 104 can transmit the NSA frequency band priority list 122, or a frequency band priority list derived from the NSA frequency band priority list 122, to the UE. The base station 104 can transmit the frequency band priority list to the UE using one or more SIBs, an RRC Connection Release message, or another type of data or message. As discussed above, the NSA frequency band priority list 122 can omit or deprioritize the SA priority band 124. Accordingly, because the base station 104 determined at block 304 that the UE is an NSA UE, the frequency band priority list provided to the NSA UE at block 312 (which corresponds with the NSA frequency band priority list 122 and omits or deprioritizes the SA priority band 124) can cause the NSA UE to avoid prioritize camping on and/or using the SA priority band 124 during situations in which the current RAN load level is at or above the load threshold.

Overall, if the current RAN load level is below the load threshold, the base station 104 can provide frequency band priority lists that are based on the SA frequency band priority list 120 to both SA UEs and NSA UEs at block 306. Accordingly, during these situations, both SA UEs and NSA UEs can prioritize camping on and/or using the SA priority band 124 indicated in the SA frequency band priority list 120. However, in other situations in which the current RAN load level is at or above the load threshold, the base station 104 can provide frequency band priority lists that are based on the SA frequency band priority list 120 to SA UEs at block 306, but provide other frequency band priority lists that are based on the NSA frequency band priority list 122 to NSA UEs at block 312.

Accordingly, during situations in which the current RAN load level is at or above the load threshold, SA UEs can be configured to prioritize camping on and/or using the SA priority band 124, while NSA UEs can be configured to prioritize camping on and/or using one or more other frequency bands 114. Shifting NSA UEs away from the SA priority band 124 can preserve remaining capacity on the SA priority band 124 for SA UEs, and/or relieve congestion on the SA priority band 124. Accordingly, traffic associated with SA UEs can be prioritized by the base station 104 over traffic associated with NSA UE, at least with respect to the SA priority band 124, and the base station 104 can thereby avoid congestion-related delays and other negative impacts on 5G-specific services used by the SA UEs via the SA priority band 124 in situations in which the current RAN load level is at or above the load threshold.

Figure 4:
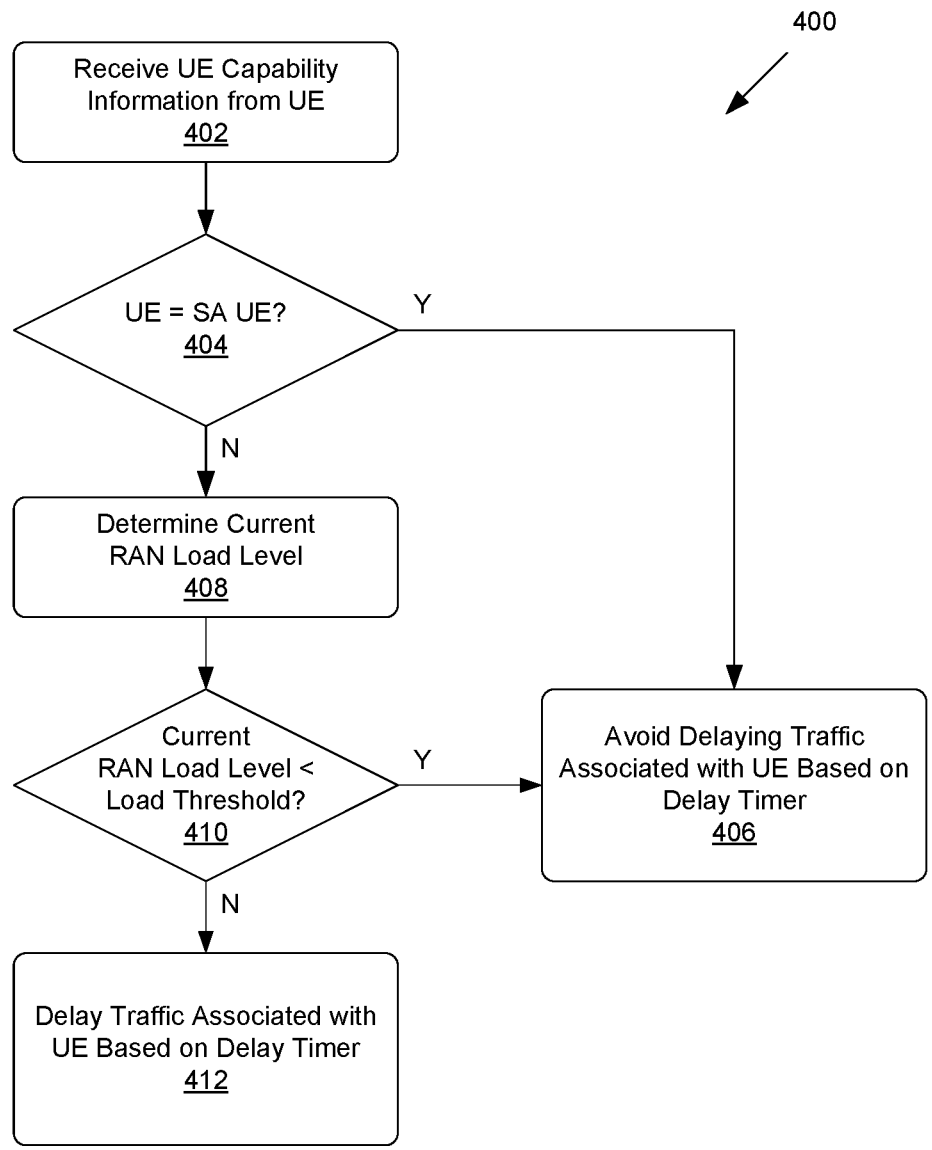
FIG. 4 shows a flowchart of a second example method by which a base station can prioritize traffic associated with SA UEs over traffic associated with NSA UEs in some situations.

FIG. 4 shows a flowchart of a second example method 400 by which the base station 104 can prioritize traffic associated with SA UEs over traffic associated with NSA UEs in some situations. At block 402, the base station 104 can receive UE capability information from a UE. The UE capability information can indicate whether the UE supports NSA 5G and/or SA 5G. If the UE capability information indicates that the UE supports both NSA 5G and SA 5G, the base station 104 can determine that the UE is an SA UE, such as the SA UE 102A shown in FIG. 1. If the UE capability information instead indicates that the UE supports NSA 5G, but does not support SA 5G, the base station 104 can determine that the UE is an NSA UE, such as the NSA UE 102B shown in FIG. 1.

In some examples, the base station 104 can receive the UE capability information from the UE during an initial registration of the UE with the telecommunication network, for instance when the UE powers on and initially attaches to the base station 104. In other examples, the base station 104 can receive the UE capability information from the UE during a mobility or handover operation in which the UE transitions from another base station to the base station 104, during a connection release operation in which the UE transitions from a connected state to an idle state, in response to a request from the base station 104 for the UE capability information, or at other times or in association with other types of operations.

At block 404, the base station 104 can determine whether the UE is an SA UE, based on the UE capability information received from the UE at block 402. If the UE capability information indicates that the UE is an SA UE (Block 404—Yes), the base station 104 can avoid delaying traffic associated with the SA UE at block 406. For example, although the base station 104 can be configured to selectively implement the delay timer 138 on one or more types of traffic, at block 406 the base station 104 can avoid implementing the delay timer 138 with respect to traffic associated with the SA UE.

If the UE capability information instead indicates that the UE is an NSA UE that does not support SA 5G (Block 404—No), the base station 104 can determine a current RAN load level at block 408. In some examples, the current RAN load level can be an overall load level, utilization rate, and/or other loading metric associated with the computing resources and/or radio resources associated with base station 104. In other examples, the current RAN load level can be associated with the SA priority band 124 specifically, such a utilization rate of the SA priority band 124, a number of UEs 102 connected to the base station 104 via the SA priority band 124, and/or any other loading metric associated with the SA priority band 124.

At block 410, the base station 104 can determine whether the current RAN load level determined at block 408 is below a load threshold. The load threshold can be configurable value defined by an operator of the base station 104. If the base station 104 determines that the current RAN load level is below the load threshold (Block 410—Yes), the base station 104 can avoid delaying traffic associated with the SA UE at block 406. For example, in this situation, although the base station 104 determined at block 404 that the UE is an NSA UE, the base station 104 can avoid implementing the delay timer 138 with respect to traffic associated with the NSA UE because the base station determined at block 410 that the current RAN load level determined is below the load threshold. Accordingly, avoiding delays of traffic associated with NSA UEs in this situation can be unlikely to impact traffic associated with SA UEs.

However, if the base station 104 determines that the current RAN load level is at or above the load threshold (Block 410—No), the base station 104 can, at block 412, use the delay timer 138 to at least briefly delay traffic associated with the NSA UE. The delay timer 138 can be set to a configurable period of time, such as a brief period measured in microseconds or milliseconds. In this situation, because the current RAN load level is at or above the load threshold, at least briefly delaying the traffic associated with NSA UEs can allow traffic associated with SA UEs to be transmitted without similar delays. This can accordingly prioritize the traffic associated with SA UEs over traffic associated with NSA UEs, and thereby avoid negatively impacting 5G-specific services used by the SA UEs in situations in which the current RAN load level is at or above the load threshold. The delay timer 138 can be set to a brief period of time that may be unlikely to be perceived by users, such that users of the NSA UEs may not take notice of a slight delay in data transmissions based on the delay timer 138.

Figure 5:
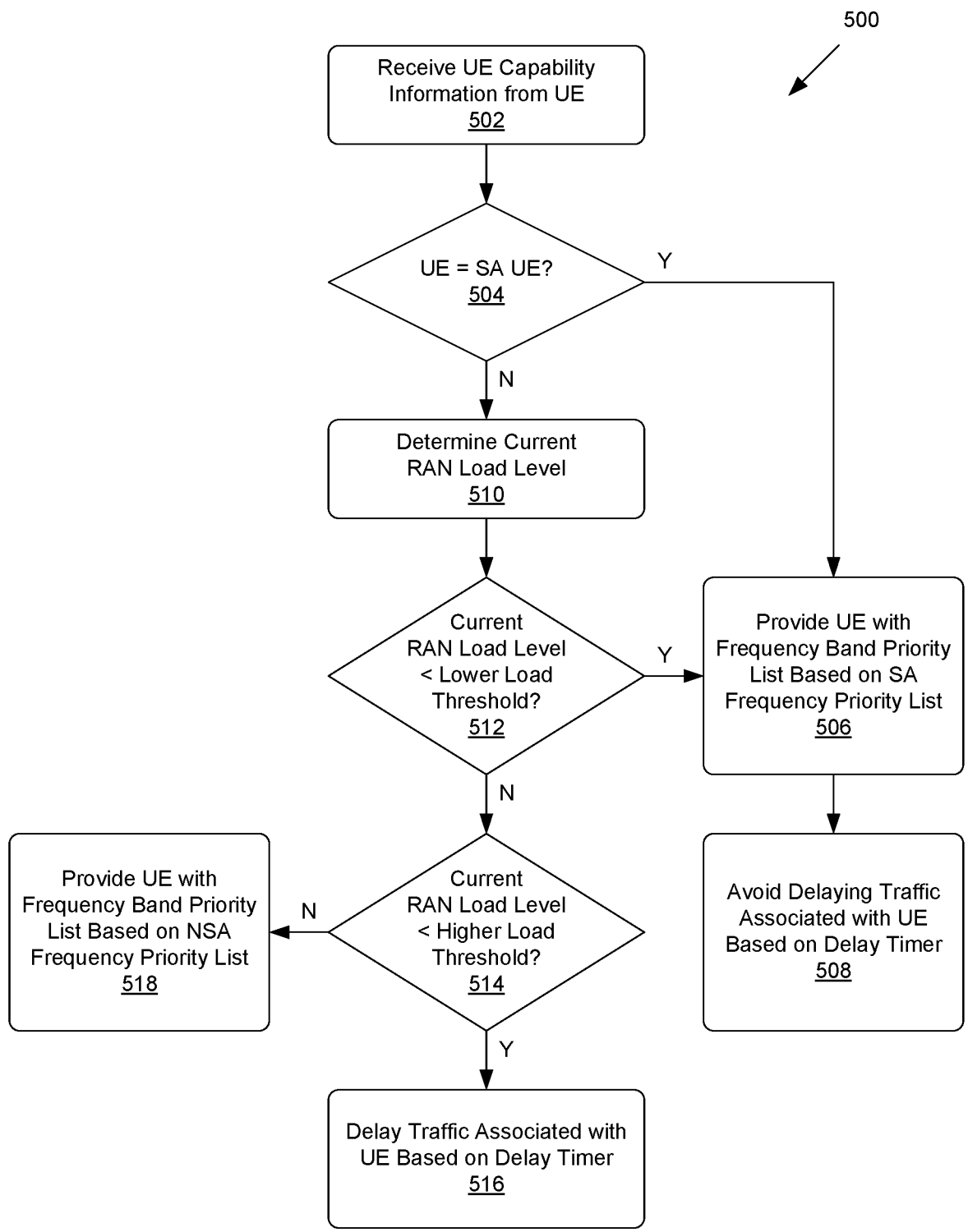
FIG. 5 shows a flowchart of a third example method by which a base station can prioritize traffic associated with SA UEs over traffic associated with NSA UEs in some situations.

FIG. 5 shows a flowchart of a third example method 500 by which the base station 104 can prioritize traffic associated with SA UEs over traffic associated with NSA UEs in some situations. At block 502, the base station 104 can receive UE capability information from a UE. The UE capability information can indicate whether the UE supports NSA 5G and/or SA 5G. If the UE capability information indicates that the UE supports both NSA 5G and SA 5G, the base station 104 can determine that the UE is an SA UE, such as the SA UE 102A shown in FIG. 1. If the UE capability information instead indicates that the UE supports NSA 5G, but does not support SA 5G, the base station 104 can determine that the UE is an NSA UE, such as the NSA UE 102B shown in FIG. 1.

In some examples, the base station 104 can receive the UE capability information from the UE during an initial registration of the UE with the telecommunication network, for instance when the UE powers on and initially attaches to the base station 104. In other examples, the base station 104 can receive the UE capability information from the UE during a mobility or handover operation in which the UE transitions from another base station to the base station 104, during a connection release operation in which the UE transitions from a connected state to an idle state, in response to a request from the base station 104 for the UE capability information, or at other times or in association with other types of operations.

At block 504, the base station 104 can determine whether the UE is an SA UE, based on the UE capability information received from the UE at block 502. If the UE capability information indicates that the UE is an SA UE (Block 504—Yes), the base station 104 can, at block 506, provide the UE with a frequency band priority list that is based on the SA frequency band priority list 120. For example, the base station 104 can transmit the SA frequency band priority list 120, or a frequency band priority list derived from the SA frequency band priority list 120, to the UE. The base station 104 can transmit the frequency band priority list to the UE using one or more SIBs, an RRC Connection Release message, or another type of data or message. The frequency band priority list provided to the UE at block 506 can indicate that the SA priority band 124 is the highest-priority frequency band, such that the UE can prioritize camping on and/or using the SA priority band 124. The base station 104 can additionally avoid delaying traffic associated with the SA UE at block 508. For example, although the base station 104 can be configured to selectively implement the delay timer 138 on one or more types of traffic, at block 508 the base station 104 can avoid implementing the delay timer 138 with respect to traffic associated with the SA UE.

If the UE capability information instead indicates that the UE is an NSA UE that does not support SA 5G (Block 504—No), the base station 104 can determine a current RAN load level at block 510. In some examples, the current RAN load level can be an overall load level, utilization rate, and/or other loading metric associated with the computing resources and/or radio resources associated with base station 104. In other examples, the current RAN load level can be associated with the SA priority band 124 specifically, such a utilization rate of the SA priority band 124, a number of UEs 102 connected to the base station 104 via the SA priority band 124, and/or any other loading metric associated with the SA priority band 124.

The base station can be configured with a first load threshold and a second load threshold. The first load threshold can be lower than the second load threshold. As a non-limiting example, the first load threshold can be a 70% utilization rate of the SA priority band 124, while the second load threshold can be a 75% utilization rate of the SA priority band 124. The load thresholds can be configurable values defined by an operator of the base station 104.

At block 512, the base station 104 can determine whether the current RAN load level determined at block 510 is below the first, lower load threshold. If the base station 104 determines that the current RAN load level is below the lower load threshold (Block 512—Yes), the base station 104 can provide the NSA UE with a frequency band priority list that is based on the SA frequency band priority list 120 at block 506, as described above, which can cause the NSA UE to prioritize camping on and/or using the SA priority band 124. The base station 104 can also avoid implementing the delay timer 138 with respect to traffic associated with the NSA UE at block 508.

If the base station 104 determines that the current RAN load level is at or above the lower load threshold (Block 512—No), the base station 104 can determine whether the current RAN load level is below the second, higher load threshold. If the base station 104 determines that the current RAN load level is at or above the lower load threshold (Block 512—No), but is below the higher load threshold (Block 514—Yes), the base station 104 can, at block 516, use the delay timer 138 to at least briefly delay traffic associated with the NSA UE. In this situation, the base station 104 may be configured to provide the NSA UE with a frequency band priority list that is based on the SA frequency band priority list 120, as described above with respect to block 506, which can cause the NSA UE to prioritize camping on and/or using the SA priority band 124. However, although the NSA UE may therefore prioritize camping on and/or using the SA priority band 124, at least briefly delaying the traffic associated with NSA UEs can allow traffic associated with SA UEs to be transmitted without similar delays. This can accordingly prioritize the traffic associated with SA UEs over traffic associated with NSA UEs, for example on the SA priority band 124, and thereby avoid negatively impacting 5G-specific services used by the SA UEs in situations in which the current RAN load level is at or above the lower load threshold but below the higher load threshold.

If the base station 104 instead determines that the current RAN load level is above the lower load threshold (Block 512—No), and is also at or above the higher load threshold (Block 514—No), the base station 104 can, at block 518, provide the NSA UE with a frequency band priority list that is based on the NSA frequency band priority list 122. For example, the base station 104 can transmit the NSA frequency band priority list 122, or a frequency band priority list derived from the NSA frequency band priority list 122, to the NSA UE. The base station 104 can transmit the frequency band priority list to the UE using one or more SIBs, an RRC Connection Release message, or another type of data or message. As discussed above, the NSA frequency band priority list 122 can omit or deprioritize the SA priority band 124. Accordingly, the frequency band priority list provided to the NSA UE at block 518 (which corresponds with the NSA frequency band priority list 122 and omits or deprioritizes the SA priority band 124) can cause the NSA UE to avoid prioritize camping on and/or using the SA priority band 124 during situations in which the current RAN load level is above the lower load threshold and is also at or above the higher load threshold.

In some examples, the base station 104 determines that the current RAN load level is above the lower load threshold (Block 512—No), and is also at or above the higher load threshold (Block 514—No), the base station 104 can provide the NSA UE with a frequency band priority list that is based on the NSA frequency band priority list 122 at block 518, and also delay traffic associated with the NSA UE based on the delay timer 138 at block 516. In other examples, the base station 104 may perform the operations of both blocks 516 and 518 if the current RAN load level is above a third load threshold that is higher than the first load threshold and the second load threshold.

Overall, if the RAN load level is below the lower load threshold, the base station 104 can provide frequency band priority lists that are based on the SA frequency band priority list 120 to both SA UEs and NSA UEs at block 506, and avoid using the delay timer 138 to delay traffic associated with both SA UEs and NSA UEs. Accordingly, during these situations, both SA UEs and NSA UEs can prioritize camping on and/or using the SA priority band 124 indicated in the SA frequency band priority list 120, and the base station 104 can avoid using the delay timer 138 to delay traffic associated with both SA UEs and NSA UEs.

However, if the RAN load level has climbed to a level that is at or above the lower load threshold, the base station 104 can provide frequency band priority lists that are based on the SA frequency band priority list 120 to SA UEs at block 506 and avoid delaying traffic associated with the SA UEs at block 508. In these situations, the base station 104 can, however begin using the delay timer 138 at block 516 to at least briefly delay traffic associated with NSA UEs, even if the base station 104 still instructs the NSA UEs to prioritize camping on and/or using the SA priority band 124. In these situations, the brief delay in the traffic associated with the NSA UEs can allow the base station 104 to prioritize transmission of non-delayed traffic associated with the SA UEs.

If the RAN load level climbs further to a level that is also at or above the higher load threshold, the base station can continue to provide frequency band priority lists that are based on the SA frequency band priority list 120 to SA UEs at block 506 and avoid delaying traffic associated with the SA UEs at block 508. However, the base station 104 can begin providing frequency band priority lists that are based on the NSA frequency band priority list 122 to NSA UEs at block 518, such that the NSA UEs are configured to avoid prioritizing camping on and/or using the SA priority band 124. This can accordingly preserve remaining capacity on the SA priority band 124 for SA UEs, and/or relieve congestion on the SA priority band 124. In some examples, the base station 104 may also use the delay timer 138 at block 516 to at least briefly delay traffic associated with the NSA UEs.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method, comprising:
   receiving, by a fifth generation (5G) base station, first user equipment (UE) capability information from a first UE;
   determining, by the 5G base station, that the first UE capability information indicates that the first UE is a standalone (SA) UE that supports SA 5G and non-standalone (NSA) 5G;
   providing, by the 5G base station, the first UE with a first frequency band priority list that causes the first UE to prioritize camping on an SA priority band;
   receiving, by the 5G base station, second UE capability information from a second UE;
   determining, by the 5G base station, that the second UE capability information indicates that the second UE is an NSA UE that supports NSA 5G and does not support SA 5G;
   determining, by the 5G base station, that a load level associated with the 5G base station is at or above a load threshold; and
   based on determining that the load level is at or above the load threshold, providing, by the 5G base station, the second UE with a second frequency band priority list that causes the second UE to prioritize camping on a frequency band that is different than the SA priority band.

2. The method of claim 1, wherein the 5G base station is connected to:
   a Long-Term Evolution (LTE) core network via an NSA 5G architecture; and
   a 5G core network via a standalone 5G architecture.

3. The method of claim 1, wherein the 5G base station receives the second UE capability information from the second UE and provides the second frequency band priority list to the second UE during at least one of:
   an initial network registration of the second UE,
   a handover operation associated with second UE, or
   a change of the second UE from a connected state to an idle state.

4. The method of claim 1, wherein the 5G base station provides the second frequency band priority list to the second UE as at least one of:
   one or more System Information Blocks (SIBs), or
   a Radio Resource Configuration (RRC) Connection Release message.

5. The method of claim 1, wherein the load level is a utilization rate of the SA priority band.

6. The method of claim 1, wherein the load level is an overall utilization rate associated with the 5G base station.

7. The method of claim 1, further comprising:
based on determining that the load level is at or above the load threshold, delaying, by the 5G base station, traffic associated with the second UE based on a delay timer, wherein the 5G base station is configured to not apply the delay timer to other traffic associated with the first UE.

8. The method of claim 1, wherein the second frequency band priority list indicates a plurality of frequency bands and corresponding priorities of the plurality of frequency bands, and omits the SA priority band from the plurality of frequency bands.

9. The method of claim 8, wherein a highest-priority frequency band indicated by the second frequency band priority list is a second-highest-priority frequency band indicated by the first frequency band priority list.

10. The method of claim 1, wherein the SA priority band is selected based on at least one of a UE type or a service type.

11. A fifth generation (5G) base station, comprising:
one or more processors; and
memory storing computer-executable instructions that, when executed by the one or more processors, cause the one or more processors to perform operations comprising:
receiving user equipment (UE) capability information from a plurality of UEs;
determining, based on the UE capability information, whether individual UEs of the plurality of UEs are standalone (SA) UEs that support SA 5G and non-standalone (NSA) 5G, or NSA UEs that support NSA 5G and do not support SA 5G;
transmitting first frequency band priority lists to the SA UEs, wherein the first frequency band priority lists indicate an SA priority band as a highest-priority frequency band; and
transmitting second frequency band priority lists to the NSA UEs that indicate:
the SA priority band as the highest-priority frequency band, based on a load level associated with the 5G base station being below a load threshold, or
a second frequency band as the highest-priority frequency band, based on the load level being at or above the load threshold.

12. The 5G base station of claim 11, wherein the 5G base station is connected to:
a Long-Term Evolution (LTE) core network via an NSA 5G architecture; and
a 5G core network via a standalone 5G architecture.

13. The 5G base station of claim 11, wherein the 5G base station receives the UE capability information from the plurality of UEs and transmits the first frequency band priority lists and the second frequency band priority lists to the plurality of UEs during at least one of:
initial network registrations of the plurality of UEs,
handover operations associated with the plurality of UEs, or
changes of the plurality of UEs from a connected state to an idle state.

14. The 5G base station of claim 11, wherein the load level is at least one of a utilization rate of the SA priority band, or an overall utilization rate associated with the 5G base station.

15. The 5G base station of claim 11, wherein the load threshold is a first load threshold, and operations further comprise:

delaying traffic associated with the NSA UEs, according to a delay timer, based on the load level being at or above a second load threshold that is lower than the first load threshold; and
transmitting the second frequency band priority lists to the NSA UEs that indicate the second frequency band as the highest-priority frequency band, based on the load level being at or above the first load threshold.

16. One or more non-transitory computer-readable media storing computer-executable instructions that, when executed by one or more processors of a fifth generation (5G) base station, cause the one or more processors to:
receive user equipment (UE) capability information from a plurality of UEs;
determine, based on the UE capability information, whether individual UEs of the plurality of UEs are standalone (SA) UEs that support SA 5G and non-standalone (NSA) 5G, or NSA UEs that support NSA 5G and do not support SA 5G;
transmit first frequency band priority lists to the SA UEs, wherein the first frequency band priority lists indicate an SA priority band as a highest-priority frequency band;
determine that a load level associated with the 5G base station is at or above a load threshold; and
based on the load level associated with the 5G base station being at or above the load threshold, performing at least one of:
delaying traffic associated with the NSA UEs based on a delay timer, or
transmitting second frequency band priority lists to the NSA UEs that indicate a second frequency band, different from the SA priority band, as the highest-priority frequency band.

17. The one or more non-transitory computer-readable media of claim 16, wherein the 5G base station is connected to:
a Long-Term Evolution (LTE) core network via an NSA 5G architecture; and
a 5G core network via a standalone 5G architecture.

18. The one or more non-transitory computer-readable media of claim 16, wherein the one or more processors receive the UE capability information from the plurality of UEs, transmit the first frequency band priority lists to the SA UEs, and performs at least one of delaying traffic associated with the NSA UEs or transmitting the second frequency band priority lists to the NSA UEs during at least one of:
initial network registrations of the plurality of UEs,
handover operations associated with the plurality of UEs, or
changes of the plurality of UEs from a connected state to an idle state.

19. The one or more non-transitory computer-readable media of claim 16, wherein the computer-executable instructions cause the one or more processors to:
delay the traffic associated with the NSA UEs in response to determining that the load level is at or above a first load threshold; and
transmit the second frequency band priority lists in response to determining that the load level is at or above a second load threshold, wherein the second load threshold is higher than the first load threshold.

20. The one or more non-transitory computer-readable media of claim 16, wherein the load level is at least one of a utilization rate of the SA priority band, or an overall utilization rate associated with the 5G base station.

* * * * *